3,192,262
TRANS - 1,2 - BIS(AMINO-METHYL)CYCLOBUTANE AND ITS PREPARATION BY HYDROGENATION OF 1,2-DICYANOCYCLOBUTANE
Ralph Courtenay Schreyer, Wilmington, Del., assignor to E. I. du Pont de Nemours and Company, Wilmington, Del., a corporation of Delaware
No Drawing. Filed Mar. 22, 1961, Ser. No. 97,454
2 Claims. (Cl. 260—563)

This invention relates to 1,2-bis(aminomethyl)cyclobutane, 3-aza(3.2.0)bicycloheptane, and to a process for their production. More particularly, this invention relates to trans-1,2-bis(aminomethyl)cyclobutane and to a process for the production of this compound together with 3-aza(3.2.0)bicycloheptane by the hydrogenation of 1,2-dicyanocyclobutane. This invention also relates to a novel class of polycarboxylamides made by the polymerization of trans-1,2-bis(aminomethyl)cyclobutane with dicarboxylic acids.

One object of this invention is to provide the novel diamine, trans - 1,2-bis(aminomethyl)cyclobutane. Another object of this invention is to provide the novel secondary amine, 3-aza(3.2.0)bicycloheptane and a process for its preparation. Another object of this invention is to provide a process for the production of trans-1,2-bis-(aminomethyl)cyclobutane and 3-aza(3.2.0)bicycloheptane, by hydrogenation of 1,2-dicyanocyclobutane. Still another object of this invention is to provide a process for the production of trans-1,2-bis(aminomethyl)cyclobutane in high yield with a minimum production of byproducts. Still another object of this invention is to provide a process for the isomerization of cis-1,2-dicyanocyclobutane to trans-1,2-dicyanocyclobutane. It is also an object of this invention to provide a novel class of nylon resins made by the condensation polymerization of trans-1,2-bis-(aminomethyl)cyclobutane with dicarboxylic acids. Other objects and advantages of this invention will appear hereinafter.

It has been discovered, in accordance with the objects of this invention, that 1,2-dicyanocyclobutane can be hydrogenated in the presence of ammonia and in the liquid phase, under at least about 100 atmospheres of hydrogen, and preferably under from about 400 to about 1000 atmospheres of hydrogen, over a hydrogenation catalyst, comprising a transition metal of Group VIII of the Periodic Table of Elements, and at a temperature in the range of 75° to 250° C. to give trans-1,2-bis(aminomethyl)cyclobutane and 3-aza(3.2.0)bicycloheptane.

It has also been discovered, in accordance with the objects of this invention, that the preferred conditions for the preparation of trans-1,2-bis(aminomethyl)cyclobutane in high yield require the use of trans-1,2-dicyanocyclobutane as the starting material with the hydrogenation being carried out at as low a temperature as will give an economic rate of reaction, usually a temperature in the range of 75° to about 150° C.

As another object of this invention, it has been found that trans-1,2-bis(aminomethyl)cyclobutane can be converted into a series of novel and useful polycarboxylamides by polymerization with dicarboxylic acids or their amide-forming derivatives.

The starting material, 1,2-dicyanocyclobutane, can be prepared by a process which involves the themal dimerization of acrylonitrile. This preparation was first described by Coyner and Hillman, J. Amer. Chem. Soc., 71, p. 324 (1949). However, the conditions of reaction described by Coyner and Hillman resulted in considerable loss to tarry, resinous polymeric byproducts. A much improved process for the dimerization of acrylonitrile to 1,2-dicyanocyclobutane is described in an application, Serial Number 857,557, filed December 7, 1959, by William L. Lehn and George R. Nacci, and now abandoned.

It is known that these processes for the dimerization of acrylonitrile yield a mixture of the cis- and trans-geometric isomers of 1,2-dicyanocyclobutane. These isomers can be separated by fractional distillation into two fractions which, after recrystallization, have boiling points, under 6 mm. pressure, of 123° C. and 165° C., respectively. Both pure isomers are solids; after recrystallization from ether-ethanol, the melting point of the lower-boiling isomer is 37–38° C. and the melting point of the higher boiling isomer is 72–73° C. According to the rule of Von Auwers-Skita (see "Steric Effects in Organic Chemistry," ed. M. S. Newman, page 20, John Wiley & Sons, Inc., New York), the higher boiling and higher melting isomer should have the cis-configuration. This assignment was confirmed by measurement of the dipole moments: the dipole moment of the low-melting isomer (trans-form) is 4.3 Debyes and the dipole moment of the high-melting isomer (cis-form) is 6.0 Debyes.

Since the preferred process for the production of trans-1,2-bis(aminomethyl)cyclobutane requires the use of trans-1,2-dicyanocyclobutane as the starting material, an aspect of the present invention is the discovery of a process for converting cis-1,2-dicyanocyclobutane to trans-1,2-dicyanocyclobutane. In accord with this aspect of the invention, it has been discovered that nickel or cobalt hydrogenation catalysts will isomerize the cis-isomer to the trans-isomer at temperatures in the range of about 150° to 350° C. While isomerization does occur in the liquid phase under these conditions, it is preferable for high conversion and recovery, to employ a vapor phase isomerization step at 250° to 350° C. A mixture consisting of the cis- and trans-isomeric 1,2-dicyanocyclobutanes, usually with the cis-isomer present in at least 50%, is vaporized and passed continuously over a bed of a cobalt or nickel hydrogenation catalyst at a temperature in the range of 150° to 350° C., preferably in the range of 250° to 350° C. It is essential that no molecular hydrogen be present in this vapor phase process. The effluent is separated into the cis- and trans-isomers by fractional distillation, and the trans-isomer is then hydrogenated in the liquid phase in accordance with the process of this invention while the cis-isomer is recirculated to the vapor phase isomerization step.

Hydrogenation catalysts which have been found operable for the conversion of 1,2-dicyanocyclobutane to trans-1,2-bis(aminomethyl)cyclobutane comprise Raney nickel and Raney cobalt, and the reduced oxides of the transition elements of Group VIII of the Periodic Table. Cobalt and nickel are the preferred catalysts since they are particularly effective in isomerizing cis-1,2-dicyanocyclobutanes to the trans-isomers. These catalysts may be supported on silica, alumina, or carbon, or they may be prepared by reduction of the pure metal oxides or salts. Whether supported or unsupported, these Group VIII reduced metal catalysts are activated by hydrogenation prior to use. Also effective are the molybdites with Group VIII metal cations, particularly cobalt or nickel molybdite.

While, as indicated hereinabove, the preferred process for the production of trans-1,2-bis(aminomethyl)cyclobutane employs the trans-1,2-dicyanocyclobutane isomer as starting material, the mixture of isomers as obtained from the dimerization of acrylonitrile is also suitable. When the mixture is employed, there is obtained as a by-product a novel secondary amine, 3-azo(3.2.0)bicycloheptane; no evidence is found for the presence of any of the theoretically-possible cis-1,2-(aminomethyl)cyclobutane, so it is believed that this isomer is completely converted to 3-aza(3.2.0)bicycloheptane under the conditions of the reaction.

Therefore, the reactions occurring in the process of this invention can be indicated by the following equations:

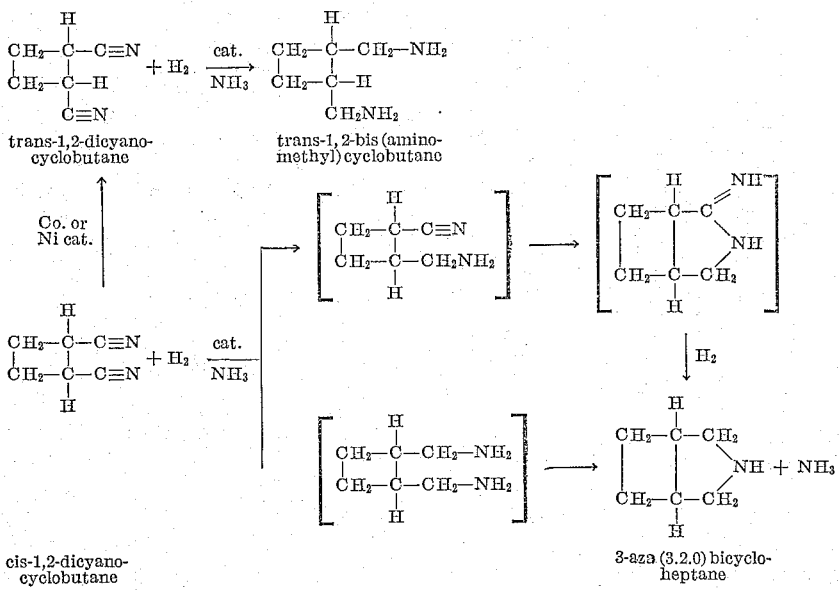

cis-1,2-dicyano-
cyclobutane 3-aza(3.2.0) bicyclo-
heptane

It is not certain by which route 3-aza(3.2.0)bicycloheptane is formed, so alternative routes are indicated in the equations.

It has been found that when the liquid phase hydrogenation of mixtures of cis- and trans-1,2-dicyanobutane is carried out in the presence of cobalt or nickel catalysts, the proportion of diamine to bicyclic secondary amine obtained may be greater than would be predicted from the proportion of trans-isomer in the starting material.

Therefore, some isomerization does occur in the liquid phase under these conditions. In view of this, it is surprising that adiponitrile is not a major product under these conditions since, as disclosed in my copending application, Serial Number 36,702, filed June 17, 1960, and now U.S. Patent No. 3,092,654, similar catalysts convert 1,2-dicyanocyclobutanes exclusively to adiponitrile when hydrogenation is carried out in the vapor phase; under those conditions, ring scission and hydrogenation of the resulting free radicals occur preferentially to reduction of the nitrile groups.

The following examples are provided to illustrate the invention but it is not intended to limit the invention thereto, since it is obvious that many variations embraced by the above descriptions of the invention are possible and will occur to one skilled in the art of hydrogenation. In these examples, parts are by weight unless otherwise indicated:

EXAMPLE 1

Thirty parts of a mixture consisting of the crude acrylonitrile dimer obtained from thermal dimerization of acrylonitrile (a mixture of cis-1,2-dicyanocyclobutane and trans-1,2-dicyanocyclobutane containing approximately 40% cis-isomer and 60% trans-isomer), 85 parts anhydrous ammonia, and 5 parts of a Raney nickel catalyst were charged to a high-pressure steel shaker tube and processed for one hour at 150° C. under hydrogen at a pressure of 600 atmospheres.

The shaker tube was cooled, the pressure vented, and the contents discharged, the tube was rinsed with methanol. Catalyst was removed by filtration. The product mixture comprised trans-1,2-bis(aminomethyl)cyclobutane, and 3-aza(3.2.0)bicycloheptane, together with methanol wash. The latter was separated by distillation. The reaction products were separated by crude fractional distillation at 1 mm. pressure, and 17 parts of the crude diamine was obtained as well as a fraction comprising 3-aza(3.2.0)bicycloheptane. The crude trans-1,2-bis(aminomethyl)cyclobutane boiled at 50–65° C./1 mm. Hg. This was refined by atmospheric pressure distillation in a three-foot, platinum, spinning-band column, yielding 8 parts of center cut having a boiling point of 193–193.5° C./atmospheric pressure; $n_D^{27.5}=1.4778$. This product was subjected to elemental analysis and to determination of its neutral equivalent with the following results:

|  | Calculated | Found |
|---|---|---|
| Percent C | 63.1 | 63.7; 63.86 |
| Percent H | 12.29 | 12.30; 12.55 |
| Percent N | 24.56 | 24.13; 12.14 |
| Neutral Eq | 57 | 56; 56 |

A repetition of the above experiment in which the Raney nickel catalyst was replaced by a Raney cobalt catalyst gave substantially equivalent products.

EXAMPLE 2

Thirty-five parts of 1,2-dicyanocyclobutane, which distilled at 124.5° to 128° C./9 mm. Hg, 85 parts of anhydrous ammonia, and 5 parts of 5% ruthenium on charcoal catalyst were charged to a steel shaker tube and processed for one hour at 225° C. under hydrogen at a pressure of 700 atmospheres. The reaction products were separated by distillation, as in Example 1. However, in the instant example, the conversion to diamine was 10.3 parts and the conversion to 3-aza(3.2.0) bicycloheptane was 7.9 parts. The latter product was characterized, after refractionation; it had a boiling point of 127–130° C. at atmospheric pressure; $n_D^{27}=1.4530$. Elemental analysis and determination of the neutral equivalent of this bicyclic secondary amine gave the following results:

|  | Calculated | Found |
|---|---|---|
| Percent C | 74.3 | 72.0; 71.6 |
| Percent H | 11.33 | 12.5; 12.3 |
| Percent N | 14.4 | 14.0; 13.9 |
| Neutral Eq | 97 | 102; 102 |

EXAMPLE 3

One hundred and twenty parts of a mixture of cis- and trans-1,2-dicyanocyclobutane isomers, 255 parts anhydrous $NH_3$, and 44 parts Raney nickel catalyst were charged to a stainless steel agitated autoclave and processed for one hour at 150° C. under 500 atmospheres of hydrogen pressure. The pressure was vented and the contents of the autoclave rinsed out with 175 cc. of methanol and filtered to remove catalyst. The filtrate was charged to a stillpot and the methanol removed by distillation.

The reaction products were then crudely fractionated by distillation to separate a center cut from foreshots and heel.

The center cut, 91.7 parts, were charged to the stillpot under a spinning band column and fractionated by distillation at atmospheric pressure. The results of this fractionation are summarized in Table A.

Table A

| Fraction | B.P. Range, °C. | Weight (parts) | $n_D^{27}$ |
|---|---|---|---|
| 1 | 120-136 | 4.9 | 1.4683 |
| 2 | 136-137 | 10.3 | 1.4750 |
| 3 | 136-137 | 4.2 | 1.4755 |
| 4 | 136-197 | 6.0 | 1.4755 |
| 5 | 197-199 | 40.3 | 1.4793 |
| 6 | 200 | 17.1 | 1.4810 |
| Heel | | 8.9 | |

Cut 2 was analyzed as the center cut consisting of pure 3-aza(3.2.0)bicycloheptane and Cut 5 was analyzed as the center cut consisting of pure trans-1,2-bis(aminomethyl)cyclobutane.

CUT 2 [3-AZA(3.2.0)BICYLCOHEPTANE]

| | Calculated | Found |
|---|---|---|
| Percent C | 74.3 | 74.7; 74.3 |
| Percent H | 11.33 | 11.9; 11.6 |
| Percent N | 14.4 | 14.13; 14.20 |
| Neutral Eq | 97 | 98; 99 |

The infrared spectrum of Cut 2 showed a band at 3.05μ characteristic of a single N—H bond as required by the assigned structure.

CUT 5 [TRANS-1,2-BIS(AMINOMETHYL)CYCLOBUTANE]

| | Calculated | Found |
|---|---|---|
| Percent C | 63.1 | 62.7; 62.7 |
| Percent H | 12.29 | 12.3; 12.6 |
| Percent N | 24.56 | 24.10; 24.24 |
| Neutral Eq | 57 | 57 |

The infrared spectrum of Cut 5 was measured and found to be consistent with the assigned structure: two N—H stretching bands in the 3μ region; a NH₂ deformation band at 6.2μ, and broad diamine absorption in the 12μ region.

EXAMPLE 4

A catalyst was prepared by reducing 50 cc. of cobalt oxide in a reaction tube by passing hydrogen at 300° C. over it for several hours. The hydrogen was displaced with nitrogen. Then a feed consisting of 72% cis- and 28% trans-1,2-dicyanocyclobutane was vaporized and passed through the tube with N₂ gas as carrier at a rate to give about 5 seconds contact time. Three temperature ranges were tried. The effluent was condensed and subsequently analyzed by gas chromatography. Results are shown in Table B.

Table B

ISOMERIZATION OF CIS- TO TRANS-1,2-DICYANOCYCLOBUTANE

| Temp., °C. | Cc./N₂ | Percent Rec. | Percent Trans- | Percent Cis- | Percent Low Boilers |
|---|---|---|---|---|---|
| 269-300 | 500 | 50 | 85 | 14 | 0.6 |
| 285-319 | 500 | 63 | 85 | 15 | 0.4 |
| 294-342 | 500 | 35 | 85 | 14 | 1.2 |

Similar results were achieved in another experiment with a reduced nickel oxide catalyst.

EXAMPLE 5

A stirred, stainless steel autoclave equipped for continuous addition and removal of liquid was charged with a cobalt catalyst prepared as described in Example 4 and with trans-1,2-dicyanocyclobutane prepared as described in Example 4. The autoclave was pressured to 600 atmospheres with hydrogen and the contents stirred and heated to, and maintained at, 125° to 150° C. Trans-1,2-dicyanocyclobutane was continuously added and product stream removed at such a rate as to provide a 30-minute average contact time.

The liquid effluent was separated by fractional distillation to recover the lower-boiling fraction, and the higher-boiling residue, unreacted trans-1,2-dicyanocyclobutane was recycled to the autoclave. The lower boiling fraction consisted essentially of only trans-1,2-bis(aminomethyl)cyclobutane which was further refined by distillation.

In another experiment, similar results were achieved using a reduced nickel oxide catalyst for the hydrogenation.

The novel polyamides with which this invention is concerned are fiber-forming, synthetic polycarboxylamides in which the carboxylamide linkages form an integral part of the polymer chains and which, upon hydrolysis, yield trans-1,2-bis(aminomethyl)cyclobutane, and at least one dicarboxylic acid selected from the group consisting of aromatic dicarboxylic acids and linear aliphatic dicarboxylic acids having from two to twelve carbon atoms in the molecule.

The polyamides of this invention can be prepared by polymerization of salts prepared by reaction of equivalent proportions of diamine and dicarboxylic acid. In a typical procedure, solutions of equivalent amounts of diamine and of dicarboxylic acid in a polar organic solvent for the monomers, such as ethanol, are mixed and the resultant, crystalline salt which precipitates is heated, in an autoclave in an inert atmosphere under autogeneous pressure at a temperature in the range of 220° to 300° C. until polymerization under these conditions is substantially complete (about one to three hours), then, to complete the polymerization, the autoclave is evacuated and the heating continued under reduced pressure with a nitrogen bleed until the evolution of water substantially ceases. Another, alternative procedure which can be employed is to react the diamine with an amide-forming derivative of the dicarboxylic acid, such as an acid chloride. Where acid chlorides are employed, it is preferable to add a base to neutralize the evolved HCl. A convenient process employing acid chlorides involves interfacial polymerization in which the acid chloride, dissolved in a water-immiscible solvent, is dispersed in an aqueous medium to which the diamine and sodium hydroxide are added in equivalent proportions.

Aromatic dicarboxylic acids which can be employed for the preparation of the polyamides of this invention include terephthalic acid, isophthalic acid, 4,4-dicarboxydiphenyl ether, diphenic acid and naphthalic acid. Aliphatic dicarboxylic acids which can be employed for the preparation of the polyamide of this invention include oxalic acid, adipic acid, sebacic acid, undecandioic acid, and dodecandioic acid.

For certain purposes, particularly for the preparation of polyamides for melt-spinning, it has been found that the polymerization of trans-1,2-bis(aminomethyl)cyclobutane with a mixture of dicarboxylic acids consisting of an aromatic dicarboxylic acid and a linear aliphatic dicarboxylic acid provides particularly valuable polyamides. By varying the proportion of aromatic to aliphatic dicarboxylic acid, polyamides having any desired melting point intermediate between the melting points of the polyamides obtained with either dicarboxylic acid alone, can be obtained.

The polycarboxylamides of this invention are useful for the preparation of textile fibers, both monofilaments and yarns. They can be employed as molding granules for the fabrication of shaped articles by extrusion and by injection molding. Fibers, tubing, and pipe are examples of useful articles which can be made by extrusion of these polyamides. Gears, housings, containers, door handles and the like can be made from these polyamides by injection molding. These polyamides are more transparent than many of the nylons previously known to commerce, making them unique in applications where transparency is desired, particularly in films and containers. Because of their optical properties, they can be pigmented or dyed to provide brilliant colored plastic articles.

The following examples of the preparation and evaluation of the polycarboxylamides of this invention are provided as illustrations of this aspect of this invention without any intention to limit the invention to the specific illustrations:

EXAMPLE 6

As an example of the preparation of a nylon from trans-1,2-bis(aminomethyl)cyclobutane, a salt was struck, in ethanol, between equivalent amounts of trans-1,2-bis(aminomethyl)cyclobutane and pure adipic acid. A quantitative yield of the crystalline salt was obtained; this salt had a melting point of 197–199° C. This salt was sealed in a glass tube under $N_2$ atmosphere and heated for 2 hours at 245° C. under autogeneous pressure. The prepolymer obtained was colorless; it was further polymerized by heating at 225° C. under a vacuum with $N_2$ bleed to carry off evolved water. The final polyamide was transparent. It had a softening point of 85°–90° C. and had a high molecular weight, as judged from its solution viscosity in meta-cresol ($\eta_I=1.3$). This nylon is a tough plastic for use in low temperature applications and as a nylon for either solution or dispersion coating of fabric substrates, paper, and the like.

EXAMPLE 7

As another example of the preparation of a nylon polymer from the novel diamine of this invention, an interfacial polymerization was carried out. A mixture of 150 ml. $H_2O$, 0.5 g. sodium lauryl sulfate (as dispersing agent), 50 ml. toluene, and 10.15 g. isophthaloyl chloride was vigorously stirred to give a dispersion of the organic phase in the aqueous phase. There was then added all at once a mixture of 75 ml. $H_2O$, 4.2 g. NaOH, and 5.7 g. trans-1,2-bis(aminomethyl)cyclobutane. The temperature rose to about 70° C., and a solid polycarboxylamide was precipitated. This polyamide was collected by filtration, washed with 10% aqueous NaOH and twice with water. After drying overnight in a vacuum oven at 100° C., the yield of polymer was found to be 9.6 g.; M.P.=200–220° C.; $\eta_I=0.7$ (meta-cresol). This high-melting nylon is particularly useful in the preparation of yarns and filaments with unique properties including high modulus which makes it a valuable fiber for crease-resistant, wash-and-wear textiles.

EXAMPLE 8

A salt was struck, following procedure of Example 6, between equivalent amounts of trans-1,2-bis(aminomethyl)cyclobutane and pure sebacic acid. The crystalline salt was isolated and heated, under autogenous pressure, in a sealed reactor at 250° C. for two hours. The pressure was released and a $N_2$ bleed passed through the melt for ½ hour at a temperature of 283° C. The polymerization was completed by heating under vacuum at 283° C. for ½ hour. The resultant polymer, on cooling, was a tough, white solid plastic. Its inherent viscosity, measured at 25° C. in meta-cresol at a concentration of 0.5 g./100 ml. solvent, was 0.74. This polymer had a melt temperature of 170° C. and a stick temperature of 143° C. The melt temperature was determined as the lowest temperature at which a small pellet melted when placed on a preheated block; the temperature was raised in increments of 2°–5° C. until the temperature was reached at which a solid pellet rapidly liquified upon contact. The stick temperature was determined by touching a piece of solid polymer to a heated block; the temperature at which the polymer would stick and then could be pulled out to a fine filament was taken as the stick temperature.

EXAMPLE 9

A salt was struck, following the procedure of Example 6, between equivalent amounts of trans-1,2-bis(aminomethyl)cyclobutane and pure terephthalic acid. The crystalline salt was isolated and heated, under autogenous pressure, in a sealed reactor at 295° C. for one hour. The pressure was released and a $N_2$ bleed passed over the prepolymer for one hour at a temperature of 295° C. The polymerization was completed by heating under vacuum at 295° C. for one hour. The resultant polyamide was extremely high melting, having a melt temperature higher than 350° C. This polymer was insoluble in meta-cresol but had an inherent viscosity of 0.40 at 25° C. when determined in 95% sulfuric acid at a concentration of 0.5 g./100 ml. of solvent.

EXAMPLE 10

A prepolymer was prepared by refluxing a mixture of trans-1,2-bis(aminomethyl)cyclobutane with excess di-n-butyloxylate. A solid prepolymer (low molecular weight polyamide) precipitated and was isolated. This solid prepolymer in the form of a powder was heated in a tubular reactor with $N_2$ passing through at 283° C. for 2¼ hours. The resultant polyamide had a melt temperature of 337° C. and an inherent viscosity of 0.35, determined in concentrated sulfuric acid at 25° C. at a concentration of 0.5 g./100 ml. solvent. This polyoxamide was insoluble in meta-cresol.

The novel secondary bicyclic amine, 3-aza(3.2.0)bicycloheptane, provided by the process of this invention, is useful as an intermediate in the preparation of several novel and useful compounds. By reaction with $CS_2$, it is converted into a carbamate which is effective as a rubber accelerator and it is useful as an ingredient in herbicides and fungicides. Conversion of the 3-aza-(3.2.0)bicycloheptane to a series of quaternary ammonium compounds by reaction with alkyl halides provides a new series of quaternary ammonium compounds useful as surfactants and in pharmaceutical preparation. 3-aza-(3.2.0)bicycloheptane is itself effective as a catalyst for the polymerization of epoxides and other ionic catalyzed polymerizations.

I claim:

1. The compound trans-1,2-bis(aminomethyl)cyclobutane.

2. A process for the preparation of trans-1,2-bis-(aminomethyl)cyclobutane which comprises isomerizing cis-1,2-dicyanocyclobutane to trans-1,2-dicyanocyclobutane by passing a mixture comprising cis-1,2-dicyanocyclobutane in the vapor phase over a hydrogenation catalyst in an inert atmosphere free of molecular hydrogen at a temperature in the range of 250° to 350° C., said hydrogenation catalyst being selected from the group consisting of cobalt metal and nickel metal, supported cobalt metal and supported nickel metal, and cobalt molybdite and nickel molybdite, subjecting the effluent from the vapor-phase isomerization reaction to fractional distillation to separate the higher-boiling, unchanged cis-1,2-dicyanocyclobutane from the lower-boiling trans-1,2-dicyanocyclobutane, and recycling the cis-1,2-dicyanocyclobutane to the isomerization step, and mixing said trans-1,2-dicyanocyclobutane with anhydrous ammonia and passing said mixture, in the liquid phase, under a pressure of hydrogen in the range of 400 to 1000 atmospheres, over a hydrogenation catalyst at a temperature in the range of 75° to 150° C., said hydrogenation catalyst being selected from the group consisting of an unsupported transition metal of Group VIII of the Periodic Table of Elements, a supported transition metal of said Group VIII, and a molybdite salt of a transition metal of said Group VIII.

References Cited by the Examiner

UNITED STATES PATENTS

| 2,163,584 | 6/39 | Carothers et al. | 260—78 |
| 2,244,192 | 6/41 | Flory | 260—78 |
| 2,292,949 | 8/42 | Lazier et al. | 260—563 |
| 2,295,406 | 9/42 | Jolly | 260—464 |
| 2,386,737 | 10/45 | Bruson | 260—464 |
| 2,469,830 | 5/49 | Knott | 260—313 |
| 2,497,839 | 2/50 | Ralston et al. | 260—313 |
| 2,534,088 | 12/50 | Webb | 260—563 |
| 2,576,959 | 12/51 | May et al. | 260—563 |
| 2,586,512 | 2/52 | Burtner et al. | 260—563 |
| 2,634,292 | 4/53 | Hellerbach | 260—563 |
| 2,818,431 | 12/57 | Beegle | 260—563 |
| 2,931,789 | 4/60 | Wielicki | 260—78 |
| 2,939,862 | 6/60 | Caldwell | 260—47 |
| 2,941,954 | 6/60 | Wilkes | 260—570.9 |
| 3,012,994 | 12/61 | Bell et al. | 260—563 |
| 3,018,271 | 1/62 | Anderson | 260—563 |

OTHER REFERENCES

Shuikina, C. A., volume 31, page 5332 (1937).

CHARLES B. PARKER, *Primary Examiner.*

HAROLD N. BURSTEIN, LEON ZITVER, *Examiners.*

UNITED STATES PATENT OFFICE
CERTIFICATE OF CORRECTION

Patent No. 3,192,262            June 29, 1965

Ralph Courtenay Schreyer

It is hereby certified that error appears in the above numbered patent requiring correction and that the said Letters Patent should read as corrected below.

Column 1, line 64, for "themal" read -- thermal --; column 2, line 67, for "3-azo" read -- 3-aza --; column 3, lines 4 to 27, for that portion of the equation reading

column 5, line 27, for "BICYLCOHEPTANE" read -- BICYCLOHEPTANE --.

Signed and sealed this 22nd day of February 1966.

(SEAL)
Attest:

ERNEST W. SWIDER            EDWARD J. BRENNER
Attesting Officer            Commissioner of Patents